United States Patent Office 3,131,131
Patented Apr. 28, 1964

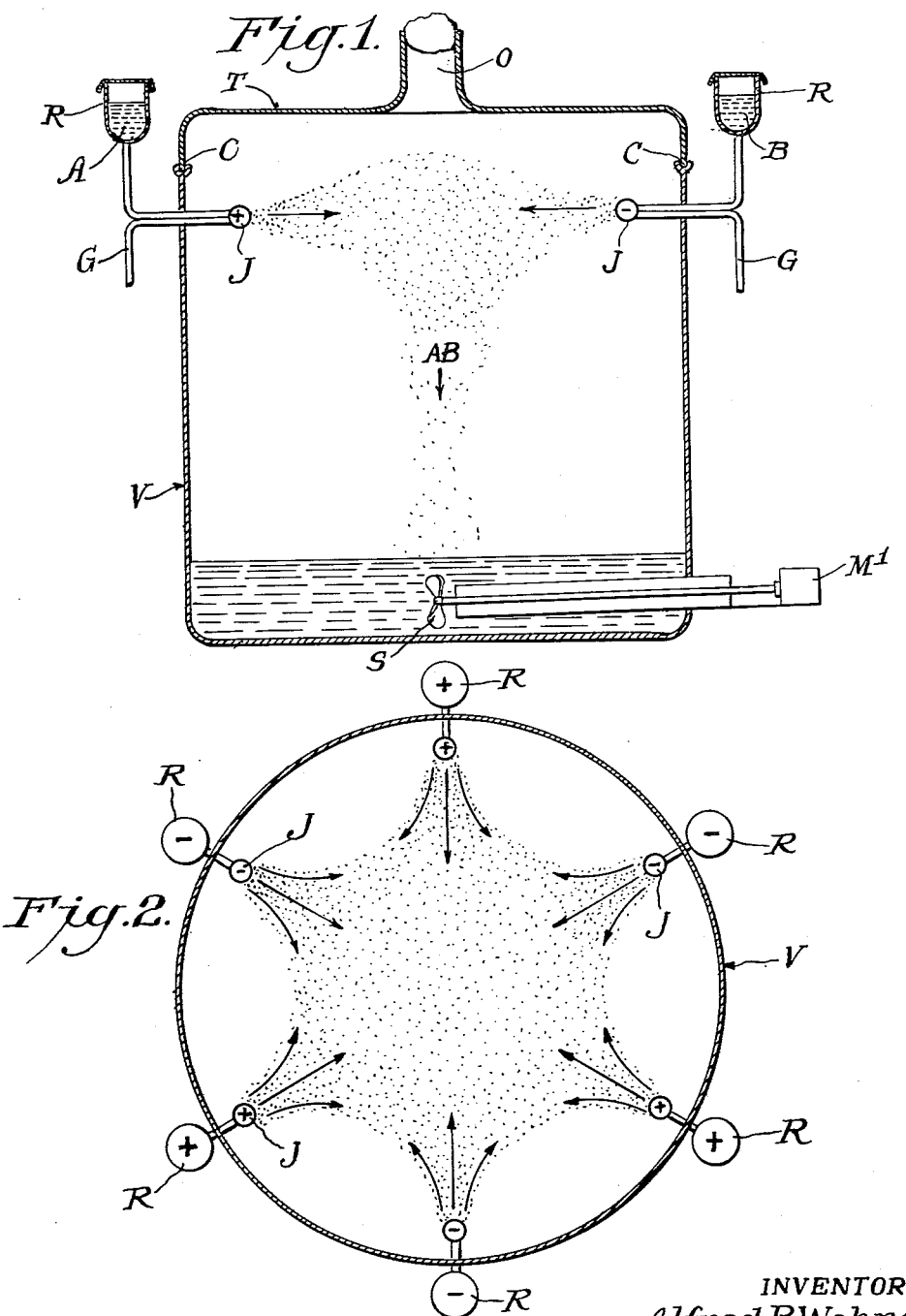

3,131,131
ELECTROSTATIC MIXING IN MICROBIAL CONVERSIONS
Alfred P. Wehner, Dallas, Tex., assignor to Socony Mobil Oil Company, Inc., a corporation of New York
Filed Apr. 3, 1962, Ser. No. 184,777
8 Claims. (Cl. 195—51)

This invention relates to microbial oxidation or utilization of hydrocarbons. More particularly, it relates to bringing microbes into intimate, maximum contact with hydrocarbon particles.

Microbial action is ordinarily effected under aqueous conditions. Such conditions are not generally conducive to action by microbes on hydrocarbons, for the hydrocarbons and the aqueous media do not readily mix. Vigorous agitation is, therefore, generally applied. While such mixing does accomplish faster microbial growth and faster utilization of hydrocarbon, the economics in large scale operations are such that the power and equipment costs for powerful stirrers are so high that feasibile operations are prevented from being adopted. An effective economic mixing technique and apparatus, therefore, are sorely needed in the microbial field. It is also needed in the chemical field particularly in the hydrocarbon chemical field, for there are many instances where insoluble reactants prolong reaction times or are the cause of low yields. For example, hydrocarbons are well known to be troublesome in reactions where they are not soluble in the substance with which they are to react. Frequently the use of mutual solvents has to be resorted to usually along with other special conditions. While this invention applies to mixing of materials, it is described with particular reference to hydrocarbon conversions and with even more particularity to the microbial conversions since living organisms are involved in these.

It is known that microbial cells may be atomized or converted from their normal state, such as a suspension in an aqueous medium, to an aerosol state using ordinary atomizers. In certain studies no noticeable decrease in the vitality of the cells was noted until about the seventy-fifth atomization of the given cells. Further, it is known that placing electrostatic charges on living organisms induces physiological or biochemical effects which are in many instances beneficial. Microbes are among those organisms affected, and it has been reported that certain bacteria respond favorably to negative charges and adversely to positive charges. Thus, it might be possible to place microbial cells into an atomized state subjecting the cells to a beneficial electrostatic charge to afford a way of getting microbes into intimate contact with hydrocarbons providing for optimum utilization of the hydrocarbons by the microbes.

Therefore, an object of this invention is to provide a method in which the optimum mixing of hydrocarbons and microbial cells is accomplished in very short times using comparatively simple means. Another purpose is to create a large surface contact of the substrate with the cells without the use of vigorous agitation or high speed stirrers. A still further objective is to increase cell division with the resultant faster conversion of hydrocarbons to other desired products. Another purpose is to provide a means for bringing materials having different polarities, solubilities or affinities into intimate contact in order to effect or enhance mixing therebetween. A still further aim is to effect such intimate contacts in hydrocarbon conversions. These and other objects will appear hereinafter.

The objectives of this invention are accomplished by atomizing at least one of two media that are to be mixed, applying an electrostatic charge to the atomized particles and then contacting it with the second medium which may or may not be similarly atomized and may or may not bear an electrostatic charge opposite to that of the first medium. When two liquids are to be mixed, each is atomized and the charges of one is opposite in polarity to the charge of the other. Where one of the fluids is a liquid and the other is a gas, the electrostatic charge is imposed only upon the liquid particles, because the gas is so widely diffused anyway. The two streams or sprays are directed toward each other, and electrostatic coupling occurs with resultant very fine and uniform mixing. Negatively charged particles seek the positively charged particles and union occurs. For example, a negatively charged microbial cell several times larger than the positively charged hydrocarbon particles coming at it will unite with several of the hydrocarbon particles. Thus, microbial clusters are avoided, and each microbial cell is in thorough contact with its food. As the cells multiply and the food decreases, the process may be repeated, or the product may be withdrawn for further processing. When the process is applied to the mixing of materials which have little affinity for each other, uniform mixtures result, and these mixtures can be used to increase rates of reaction and yields, or the mixtures can be placed into a permanent or semi-permanent condition as by gelling or freezing.

This invention will be further understood by reference to the following description, the examples and the figures all of which is given for illustrative purposes only and are not to be taken as limitative. Parts and percentages are by weight unless otherwise specified. The figures are as follows:

FIGURE 1 is a schematic diagram of apparatus of this invention used for mixing two liquid systems;

FIGURE 2 is a sectional plan view of an apparatus similar to that of FIGURE 1 but equipped with a plurality of jets.

Figure 3:
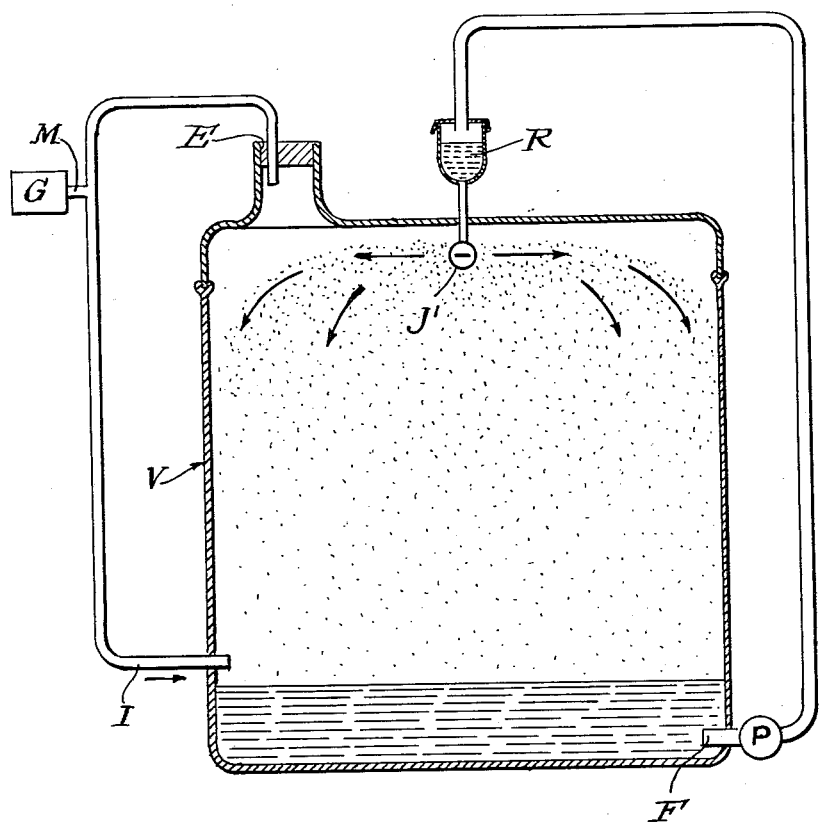
FIGURE 3 is a schematic diagram of apparatus used in mixing liquid-gas systems.

As shown in FIGURE 1 vessel V is equipped with two jets J which protrude from opposite points on V into its upper part. Each jet is connected to a reservoir R, one containing liquid A and the other liquid B. To effect the mixing of these liquids by electrostatic coupling, gas is led through respective gas pipes G under desired pressures. Usually a pressure of about 1 to about 4 atmospheres is used. One jet is under a positive charge and the other is under a negative charge usually equal to the positive charge. The jets used can be of a variety of types such as the Barthel jet. In principle the liquid to be atomized is fed to metallic charged surfaces in the jet and the gas sweeps thin films of the liquid from the metallic surfaces tearing the films into small droplets. These can vary in size depending, among other parameters, upon the jet design and generally droplets having diameters in the range of about 0.5 to about 5.0$\mu$ are produced. The polarity of the applied charge is chosen according to the desired purpose. The gas that is used in the sweeping is usually air but many other gases may be employed. For example, the gas may be methane, ethane, propane, n-butane or any volatile hydrocarbon and such gases are advantageously used in the microbial processes of this invention.

Each jet stream then is unipolar and is highly charged. For example, droplets so formed carry a mean charge of 1600 electrostatic units (le. s.u.=$1.59\times10^{-19}$ coulombs). Two desirable effects result: (1) there results a dispersion which is finer and more uniform than can be obtained by a mere mechanical subdivision with optimum increase in surface area and reactivity and (2) the aerosol emitted from a jet is stabilized because the like charges on adjoining droplets being emitted effect a movement away from the droplets so that they stay apart, uncoalesced, until neutralization with the oncoming particles of opposite polarity.

The united or mixed droplets of A and B settle and drop as AB to the bottom of the vessel. For example, A may be a hydrocarbon and B may be a microbial suspension. The bottom layer in V contains a thoroughly mixed microbial medium. After a suitable time it may be removed through an outlet, not shown, in the bottom of V, or by siphoning or dismantling V as the vessel V may be equipped with a detachable top T, as shown at the coupling C, to provide convenient access to the microbial medium or to the jets J for periodic cleaning. A simple opening O, plugged with a porous material, such as cotton, provides an outlet in the top of the vessel preventing a build-up of gas pressure. The means for preventing the build-up of gas pressure may be any conventional preventive means including, for example, the usual coiled tube which operates on the principle of a reflux condenser and which ends in a goose-neck to prevent contamination from the outside. A stirrer S, driven by M', may be present to stir the mix AB as desired or the motor may be used to drive a blade to skim off products or unchanged hydrocarbon for isolation or recycling. The impeller S may be positioned vertically if desired.

In the modification shown in FIGURE 2, a plurality of jets is arranged around the vessel V, as shown, and the charge is alternated. Thus, each jet has on either side of it a jet emitting particles bearing charges opposite to the charge on the particles it is emitting. This provides a large capacity for electrostatic jet mixing. A given jet stream not only interacts with the stream opposite it coming head-on but it interacts with the adjacent jets of opposite polarity.

When one of the fluids to be mixed is a gas, the equipment shown in FIGURE 3 may be used. A centrally located charged jet J is used to generate a very fine and stable electroaerosol in vessel V which is filled with the desired gas. Usually an inlet or inlets for the gas I and a gas outlet E going to mixing valve M is supplied so that gaseous matter can be recirculated, although in many instances this recirculation is not needed. Similarly, the microbial medium can be recirculated from the bottom of the vessel at F by pump P up to reservoir R. In any event the minute size of the aerosol droplets together with the repelling effect of high unipolar charges creates a large surface area for better reactivity and a stability in or maintenance of droplet formation providing sufficient reaction time.

The following examples further illustrate the working and principles of this invention.

EXAMPLE I

An aqueous medium is prepared by dissolving 1.0 gram of ammonium sulfate, 0.3 gram of disodium hydrogen phosphate, 0.2 gram of potassium dihydrogen phosphate, 0.2 gram of magnesium sulfate septahydrate, 0.1 gram of sodium carbonate, 0.01 gram of calcium chloride, 0.005 gram of ferrous sulphate septahydrate and 0.002 gram of manganous sulphate in 1 liter of distilled water. To this is added 0.05 gram (dry weight) of *Nocardia corallina* and the resultant aqueous medium is simultaneously atomized and negatively charged by passing through reservoir B and the jet equipment as shown in FIGURE 1. While it is being so treated, a liquid hydrocarbon, n-hexane, is atomized and positively charged as it passes from reservoir A through its respective jet.

An intimate mixture of microbial cells and hydrocarbon is formed in which the microbial cell clusters are minimized. Rather, the cells are placed in individual positions in contact with a considerable amount of hydrocarbon yet in adequate growth relationship with the nutrient mineral medium. A yield of beta-carotene comparable to that obtained with vigorous mechanical agitation is obtained but with less power output and in a shorter time.

EXAMPLE II

Using equipment similar to that shown in FIGURE 3, n-butane is circulated through vessel V while *Nocardia salmonicolor* in the aqueous medium described in Example I is circulated through by means of pump P and reservoir R. After about 140 hours approximately 11 grams of dried cells per liter is obtained containing an amount of beta-carotene equal to 0.8 mg./g. of dried cells.

EXAMPLE III

An aqueous waste to be disposed of as a by-product and containing about 90 parts per million of crude oil is atomized into droplets that are positively charged. Simultaneously it is exposed to a jet stream of an aqueous medium containing mineral salts and a wide-variety of microbes but rich in microbes active on hydrocarbons. The microbes present are predominantly *Pseudomonas, Nocardia, Mycobacteria* and *Penicillia*. Even though crude oil is one of the most difficult hydrocarbonaceous materials for destruction by microbes, about 60% destruction of the crude oil occurs under the prevailing conditions in about 8 hours. Organic non-oily matter in the waste is completely utilized. After sedimentation, a clear, neutral aqueous effluent is available for irrigation, discharge into streams or for recirculating in the process of the invention. The microbial matter is utilized for charging other operations or is converted into fertilizer.

EXAMPLE IV

An aqueous medium similar to that used in Example I is made but containing no ammonium sulphate or any other nitrogen containing material and containing a molybdate salt with a small inoculum of *Bacterium nitrimethanicum* or *Pseudomonas nitrimethanica*, and the resultant mass is atomized and negatively charged in the equipment shown in FIGURE 3 while methane, nitrogen and air are circulated through the vessel V. The temperatures are kept about 25° C. to about 30° C. The aqueous medium very quickly becomes turbid and an excellent growth results. The methane and nitrogen and oxygen are replenished at mixing valve M from time to time or by a steady bleeding in of each component. When the growth rate levels off, the microbial mass with nitrogen now in a fixed form is then withdrawn and used directly as fertilizer saving small portions of the sludge for charging further runs.

The Nocardia described above measure normally about 3 to about 5 in length and about 1 in width. As pointed out previously, the jet can be adjusted to produce droplets of about 0.5 to about 5 in diameter. Thus, ideal distribution can be effected since the mean droplet size of the aerosol is about equal to the size of the individual microbe. Microbial clusters, unwanted because so much cell wall surface is contacting only other cell walls, are avoided. Since the particle containing the microbe can be made larger in size than the oil or hydrocarbon particle, it can carry a higher charge, and it will attract several oil droplets. There results a cluster of oil droplets around a microbial cell. Pressure and voltage adjustments are relied upon to get the size of the hydrocarbon aerosol particles at the lowest possible diameter; this achieves a maximal surface area. For example, a unipolar charge of 40–60 kv. at 0.12 milliampere is applied at the jet and a positive polarity is applied to the hydrocarbon aerosol. The fine oil aerosol forms a comparatively stable belt through which the heavier microbial aerosol slowly drifts due to gravitation. In most cases the mass settling at the bottom is so thoroughly mixed that no breaking into oil and water phases occurs, but even if this does occur, the oil particles that go together take with them the microbial cell and some of the aqueous nutrient trapped or surrounded by oil droplets so that growth continues. In some instances it is desirable, as mentioned above, to provide a slow speed stirrer S at the bottom of vessel V just to assure proper aeration and metabolic product diffusion. Such slow agitation is adequate for the continued three-dimensional habitat of microbial cells and avoidance of spacially restrictive two-dimensional growth forms.

In those instances where microorganisms are being processed it is to be appreciated that this invention is not limited to any particular organism. Thus, it can be applied to microbes, bacteria, fungi, algae and the like and to any of the several commercial processes using such organisms including the production of penicillin and similar drugs, for example. A number of microorganisms which may be used are given for illustrative purposes: *Nocardia salmonicolor, Nocardia corallina, Nocardia rubra, Mycobacterium paraffinicum, Mycobacterium paraffinicum,* smooth strain, *Pseudomonas aeruginosa, Pseudomonas fluorescens, Mycobacterium phlei, Mycobacterium lacticol, Nocardia paraffinae, Nocardia opaca, Pseudomonas putida, Pseudomonas oleovorans,* the various Bacillus, the various Clostridia, the yeast-like Torula and filamentous fungi such as Penicillium and Phycomyces. The processes and apparatus of this invention may also be applied to effect the fixation of nitrogen using microorganisms such as *Bacterium nitrimethanicum, Pseudomonas nitrimethanica* or *Pseudomonas nitrimethanica* var. *citreous* as described in copending application S.N. 165,510. For example, methane is discharged through a charged jet into the reactor, the particles receiving a positive charge while *Bacterium nitrimethanicum* is discharged through an opposing jet, these particles receiving a negative charge. The usual nutrient, but containing no nitrogen, is also sprayed simultaneously with the reactants. While the nutrient can be contained in the non-microbial spray or sprayed separately, it is usually sprayed as a component of the microbial stream.

A typical aqueous nutrient is given in Example I and it is to be understood that the various examples given above include the use of such nutrients and that these will be modified to suit the microorganisms. The conditions of temperature, time, nutrient make-up and amount are described in copending applications on the biosynthesis of beta-carotene, S.N. 149,112; on the biosynthesis of certain polymeric material S.N. 148,987; on the biosynthesis of waxes, S.N. 149,831; on the oxidation of hydrocarbons, S.N. 850,015 and on the microbial disposal of oily wastes, S.N. 158,655. When the various processes disclosed in these copending cases and the conditions therein are employed in accordance with the principles of this invention, better yields of the respective products are obtained in shorter times under conditions which are comparable but which do not demand violent agitation. The products are generally isolated in the manners described in said applications. However, it is to be appreciated that the various inventions described in the various copending applications referred to herein are not dedicated to the public but are claimed in those applications and, further, that an understanding of this present invention is not dependent in any way upon the material in those copending applications which are referred to merely for illustrative purposes.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. A process for the conversion of hydrocarbons which comprises forming a stream of finely divided hydrocarbon particles bearing like electrical charges; ejecting said stream into a reaction vessel; simultaneously forming a second stream of finely divided material comprising a micro-organism reactive with said hydrocarbon, said finely divided material if not electrically neutral then bearing an electrical charge opposite that borne by said hydrocarbon particles; and ejecting said second stream into said vessel toward said first stream to effect thereby commingling of said streams and interaction between components of the particles to induce chemical change of said hydrocarbons.

2. A process in accordance with claim 1 in which the said second stream comprises microorganisms which are negatively charged.

3. A process in accordance with claim 1 in which the said second stream comprises microorganisms which are negatively charged and the particles in the said first stream are positively charged.

4. A process in accordance with claim 1 in which one of said streams is a gas.

5. A process for increasing growth of microorganisms feeding on hydrocarbons which comprises mixing a stream comprising finely divided particles which includes living cells of said organisms and which bear an electrostatic charge with a stream of finely divided particles which include hydrocarbons.

6. A process in accordance with claim 5 in which the said hydrocarbon stream contains hydrocarbon particles that bear an electrostatic charge opposite to that of said stream of microorganisms.

7. A process in accordance with claim 5 in which the said cells are negatively charged.

8. A process in accordance with claim 5 in which the said second stream is a gas.

References Cited in the file of this patent

UNITED STATES PATENTS

| | | |
|---|---|---|
| 2,600,129 | Richards | June 10, 1952 |
| 2,697,061 | Harris et al. | Dec. 14, 1954 |
| 2,697,062 | Cramer | Dec. 14, 1954 |
| 2,890,388 | Croskey et al. | June 9, 1959 |